United States Patent [19]

Estabrook

[11] Patent Number: 4,528,776
[45] Date of Patent: Jul. 16, 1985

[54] HONING MACHINE WITH STONEWEAR COMPENSATOR

[75] Inventor: Mark R. Estabrook, Rockford, Ill.

[73] Assignee: Barnes Drill Co., Rockford, Ill.

[21] Appl. No.: 507,357

[22] Filed: Jun. 24, 1983

[51] Int. Cl.³ .............................................. B24B 33/06
[52] U.S. Cl. .................................. 51/34 C; 51/165.87
[58] Field of Search ................. 51/34 R, 34 C, 34 D, 51/165.87, 165.93, 165.88

[56] References Cited

U.S. PATENT DOCUMENTS

| | | | |
|---|---|---|---|
| 2,780,893 | 2/1957 | Seborg et al. | 51/34 |
| 2,781,616 | 2/1957 | Estabrook | 51/184.3 |
| 2,795,089 | 6/1957 | Seborg | 51/184.3 |
| 2,819,566 | 1/1958 | Johnson | 51/184.3 |
| 3,403,480 | 10/1968 | Ribillard | 51/165.87 |
| 3,818,642 | 6/1974 | Seidel | 51/165.87 |
| 3,971,168 | 7/1976 | Nishimura et al. | 51/165.87 |

Primary Examiner—Frederick R. Schmidt
Assistant Examiner—Debra S. Meislin
Attorney, Agent, or Firm—Leydig, Voit, Osann, Mayer & Holt, Ltd.

[57] ABSTRACT

A reversible d.c. torque motor advances and retracts a cone mechanism for radially expanding and contracting the stones of a tool for honing a bore in a workpiece. The motor is adapted to advance the cone mechanism at three different speeds so as to effect expansion of the tool first at a rapid traverse rate, then at a slower coarse feed rate and then at a still slower fine feed rate. Pulses representative of changes in position of the cone mechanism are routed to and are counted by a reversible counter which causes the cone mechanism to retract to different starting positions as the stones of the tool wear and reduce the effective diameter of the tool.

7 Claims, 3 Drawing Figures

HONING MACHINE WITH STONEWEAR COMPENSATOR

BACKGROUND OF THE INVENTION

In the usual honing machine, the honing tool is expanded, that is, the stones of the tool are moved radially outwardly, by turning a shaft which shifts the expanding cams in the tool. When the tool is first inserted into the bore of the work to be honed, the stones are in a radially collapsed position and are initially expanded at a relatively fast rapid traverse rate by a motor which turns the shaft. This continues until just before the stones engage the wall of the bore, at which time the shaft is turned at a slower speed to expand the stones into the work at a reduced rate sometimes referred to as a coarse feed rate. Thereafter, the shaft is turned at a still slower speed to expand the stones at a relatively slow fine feed rate and effect honing of the bore as the stones rotate and reciprocate. When the bore has been honed to a predetermined diameter, an "at-size" signal is automatically produced and effects radial collapse of the stones to enable the tool to be withdrawn from the bore.

As the stones wear, the effective diameter of the tool is reduced. As a result, a tool with worn stones must be expanded through a greater distance from a given starting point than a tool with new stones before the stones engage the wall of the bore. If the tool is expanded from the same starting point at the beginning of each cycle, the intervals of rapid traverse, coarse feed and fine feed will be of improper duration as stonewear occurs.

In order to take stonewear into account, prior honing machines have included electro-mechanical compensators which detect the stonewear and which cause the tool to retract to progressively less collapsed starting points as stonewear occurs. While such compensators do tend to adjust the rapid traverse, coarse feed and fine feed cycles as the stones wear, they are not highly accurate. Moreover, prior electro-mechanical stonewear compensators are structurally complex and require the machine operator to make various mechanical adjustments to reset the compensator each time the stones are replaced.

SUMMARY OF THE INVENTION

The general aim of the present invention is to provide a new and improved honing machine having a unique stonewear compensator which, when compared with prior compensators, is of simpler construction and is more precisely accurate in operation and which, once properly set for a series of like bores, may be more quickly and easily reset when the stones are replaced.

A more detailed object of the invention is to achieve the foregoing by providing a honing machine in which the stonewear compensator comprises a reversible counter which may be easily set to establish the intervals for rapid traverse, coarse feed and fine feed and which automatically causes the tool to retract to progressively less collapsed positions as stonewear occurs.

A further object of the invention is to provide a honing machine in which a single drive motor may be used to expand the tool at different selected constant rates with the expansion rate being limited directly by the pressure exerted by the tool on the wall of the bore.

These and other objects and advantages of the invention will become more apparent from the following detailed description when taken in conjunction with the accompanying drawings.

DETAILED DESCRIPTION OF THE PREFERRED EMBODIMENT

Figure 1:
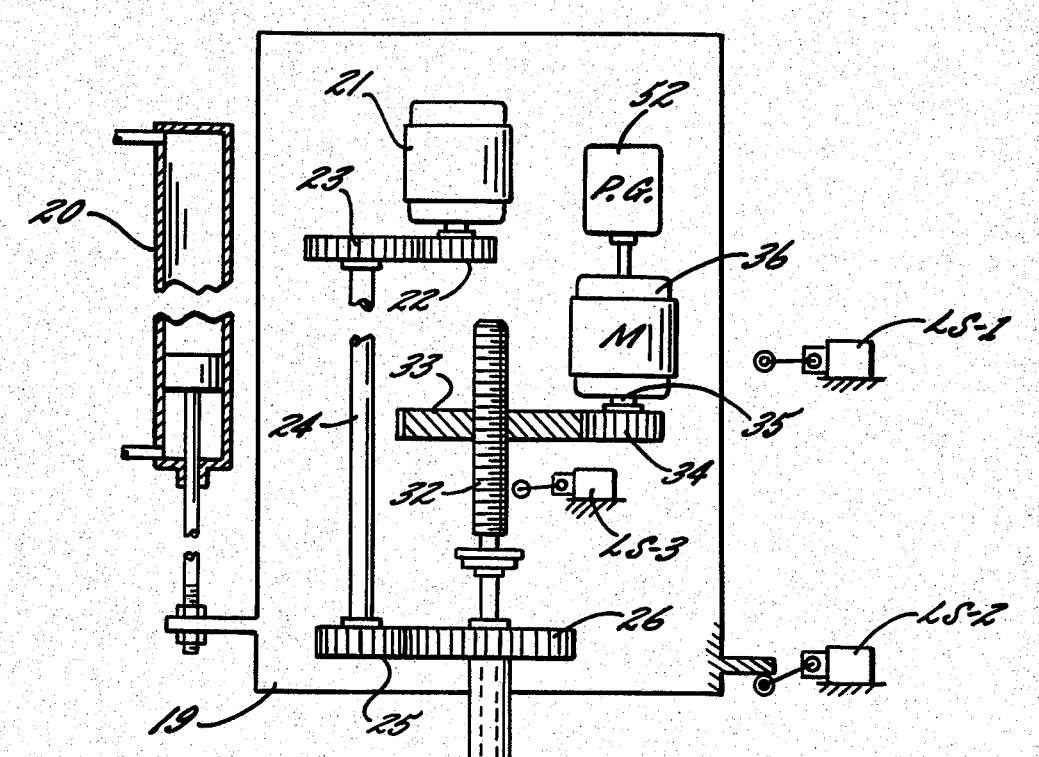
FIG. 1 is an elevational view which schematically shows a new and improved honing machine incorporating the unique features of the present invention.
Figure 1:
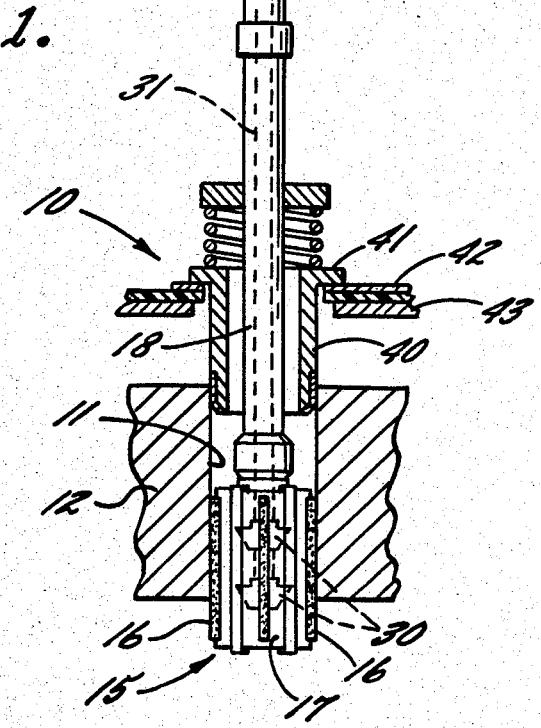

As shown in the drawings for purposes of illustration, the invention is embodied in a machine 10 for honing the bore 11 of a workpiece 12. The machine includes the usual tool 15 which comprises a plurality of stones 16 mounted on a body 17 and spaced angularly around the body. The latter is fixed to a tubular shaft 18 journaled in a head 19 which is slidably mounted on a column (not shown) for reciprocation by a hydraulic actuator 20 so that the tool 15 is reciprocated in the bore 11 during the honing cycle.

As the tool 15 is reciprocated, it also is rotated by a motor 21 mounted on the head 19 and adapted to drive the shaft 18. For this purpose, a gear 22 on the output shaft of the motor meshes with a gear 23 fast on one end of a shaft 24 which is journaled in the head. A gear 25 on the other end of the shaft 24 meshes with a gear 26 fixed to the shaft 18.

As is customary in machines of this type, the stones 16 are mounted on the tool body 17 to move radially inwardly and outwardly and are urged toward their innermost or collapsed position by springs (not shown). The stones are moved out into engagement with the wall of the bore 11 and then are fed outwardly into the work during the honing operation by conical cams 30 which act on the back of the stones in a manner well known in the art. The cams are mounted on the end of a rod or shaft 31 which is concentrically disposed within the hollow shaft 18. The upper end portion 32 of the shaft 31 projects beyond the end of the shaft 18 and is threaded into a gear 33 journaled in the head 19. A gear 34 meshes with the gear 33 and is adapted to be rotated by the shaft 35 of a reversible variable speed drive motor 36. When the shaft 35 is rotated in one direction, it acts through the gears 33 and 34 and the shaft 31 to advance the cams or cone mechanism 30 downwardly and radially expand the tool 15. When the shaft 35 is rotated in the opposite direction, the cone mechanism 30 is retracted upwardly to allow the tool to collapse.

At the beginning of each honing cycle, the head 19 is fully retracted so that the tool 15 is located out of the bore 11. In addition, the tool is partially collapsed so that it may enter the bore.

A cycle is initiated by shifting the head 19 downwardly to cause the tool 15 to enter the bore 11. Thereafter, the motor 36 is energized in a direction to expand the tool and is operated at such a speed as to effect the expansion at a relatively fast rapid traverse rate. As a result, the tool is expanded rapidly until the stones 16 are just short of the wall of the bore. At this time, the speed of the motor 36 is reduced so as to prevent the stones from impacting against and being crushed by the wall of the bore and to expand the stones into or very close to engagement with the wall at a slower coarse feed rate. Thereafter, the speed of the motor is reduced still further to cause the stones to expand at a slower fine feed rate. During such expansion, the tool is rotated and is reciprocated upwardly and downwardly so as to cause the stones to hone the bore and increase the diameter thereof.

When the bore 11 is honed to the desired diameter, sensing means in the form of a gage plug 40 enters the bore and causes an "at-size" signal to be produced. Herein, the gage plug 40 is mounted to reciprocate with the shaft 18 and includes a radially extending flange 41. The plug attempts to enter the bore each time the tool 15 is at the bottom of its stroke. When the bore reaches size, the plug does enter the bore and allows the flange 41 to engage a contact plate 42 supported on and insulated from a mounting bracket 43. Contact of the flange 41 with the plate 42 produces an electrical "at-size" signal which causes the tool 15 to collapse and to withdraw from the bore preparatory to the next cycle.

As the stones 16 wear, the effective diameter of the tool 15 is reduced. If the worn tool is collapsed radially to the same starting position at the end of each cycle, the tool must be expanded outwardly through a progressively greater distance during each succeeding cycle to cause the stones to reach the wall of the bore 11. To avoid this drawback, prior honing machines have included compensators which, as the stones wear, cause the tool to contract radially to progressively less collapsed starting positions so that, when the tool is expanded during each subsequent cycle, the tool will move through approximately the same distance to bring the stones into engagement with the wall of the bore.

In accordance with the present invention, the machine 10 includes a new and improved compensator 50 (FIG. 2) which makes advantageous use of a reversible counter 51 to enable stonewear compensation to be effected in a simpler and more precise manner than has been possible heretofore. In addition to being very precise, the present compensator 50 is characterized in that it is easy to set and reset and is free of mechanical structure which encumbers the head 19 of the machine 10.

More specifically, the reversible counter 51 (FIG. 2) which is used herein preferably is a three decade counter-controller of the type sold by Electronic Counters & Controls, Inc. of Mundelein, Ill. under the trade designation SBL133. The counter is capable of counting input pulses applied either to its count-up input terminal CU or to its count-down input terminal CD. A signal representative of the magnitude and sign of the count held by the counter at any given instant appears on the count terminals CT of the counter. If the count held by the counter is above zero, the output signal on the count terminals CT has a positive sign and, if the held count is below zero, the output signal has a negative sign. When the held count is zero or above, pulses applied to the count-up terminal CU normally cause the count to increase in a positive sense from zero while pulses applied to the count-down terminal CD normally cause the count to decrease toward and then cross zero. When the held count is zero or below, pulses applied to the count-down terminal CD cause the count to increase in a negative sense from zero while pulses applied to the count-up terminal CU cause the count to decrease toward and then cross zero. Thus, the counter is capable of counting both upwardly and downwardly on either side of zero.

Pulses are routed to the counter 51 as a function of changes in the position of the cone mechanism 30 for radially expanding the tool 15. For this purpose, a conventional pulse generator 52 (FIG. 2) is connected to be driven by the output shaft 35 of the motor 36. When the shaft 35 is turned in a direction to advance the cone mechanism and expand the tool, pulses appear on the output terminal E of the pulse generator and are routed to the count-up terminal CU of the counter. Conversely pulses appear on the output terminal C of the pulse generator and are routed to the count-down terminal CD of the counter when the shaft 35 is driven in the opposite direction to retract the cone mechanism and contract the tool. Since the position of the shaft 35 is representative of the position of the cone mechanism 30 and since pulses are routed to the counter 51 as a function of changes of the position of the shaft, the count held by the counter at any given instant is representative of the instantaneous position of the cone mechanism and so is the output signal appearing on the count terminals CT of the counter. When the stones 16 are new, the output signal appearing on the count terminals CT is also representative of the effective diameter of the tool 15.

Associated with the counter 51 are three comparators 61, 62 and 63 (FIG. 2) each having an input connected to the count terminals CT of the counter so as to receive the output signal appearing thereon. Banks 71, 72 and 73 of presetting switches are associated with the comparators 61, 62 and 63, respectively, each switch bank supplying a signal to another input of the respective comparator. Each switch bank includes three rotary switches 75 which may be manually adjusted to cause the signal applied to the comparator by the bank to correspond to any number between 0 and 999. Each comparator produces a momentary signal on its output terminals when the count held by the counter and applied as a signal to one input of the comparator equals the number dialed in on the switch bank of the comparator and applied as a signal to the other input of the comparator. If, for example, the number 300 has been dialed in on the switch bank 71, the comparator 61 will produce a momentary signal on its output terminals when the count held by the counter 51 registers at 300. The conparator 61 is biased such that it will produce a momentary output signal only when the count held by the counter is a positive number and agrees with the number dialed in on the switch bank 71. The same is true of the comparator 62. On the other hand and for a purpose to be explained subsequently, the comparator 63 will produce a momentary output signal any time the count held by the counter registers with the number dialed in on the switch bank 73 regardless of whether the count is a positive number or a negative number.

Advantageously, the motor 36 which is used herein to expand and contract the tool 15 is a reversible d.c. servo motor or torque motor whose speed may be accurately varied and controlled and whose torque may be limited to a maximum value independently of speed. A suitable motor is one sold by Gould Inc. (Gettys Motion Control Division) of Racine, Wis. and identified as Type 16-0071-43. The motor is energized and controlled by way of a suitable driver-amplifier 79 (FIG. 2) which may be a Model N133 servo controller sold by Gould Inc. Associated with the driver-amplifier is a potentiometer 80 which may be adjusted to limit the maximum torque capable of being developed by the motor.

As explained above, the speed of the motor 36 is controlled so as to effect expansion of the tool 15 first at a rapid traverse rate, then at a slower coarse feed rate and then at a still slower fine feed rate. To set the three expansion rates at desired values, three potentiometers 81, 82 and 83 (FIG. 2) are connected across a source 85 of positive d.c. voltage and are adapted to be selectively connected to a reference terminal of the driver-amplifier 79. The setting of the potentiometer 81 determines the rapid traverse rate, the setting of the potentiometer 83 determines the coarse feed rate and the setting of the potentiometer 82 determines the fine feed rate. A fourth potentiometer 86 is connected to a source 87 of negative d.c. voltage and is adapted to be selectively connected to the reference terminal of the driver-amplifier 79. The setting of the potentiometer 86 determines the speed at which the motor 36 retracts the cone mechanism 30 to collapse the tool 15.

By setting the potentiometer 80, the torque developed by the motor 36 can be limited to a maximum safe value regardless of the speed of the motor. The machine 10 thus is protected against damage. If, for example, the stones 16 should happen to engage the wall of the bore 11 while being expanded in the rapid traverse mode, the driver-amplifier 79 will limit the torque of the motor and place the motor in a stall condition to prevent the expanding mechanism 30 from being damaged by continued rapid expansion of the tool 15. By the same token, the driver-amplifier limits the torque of the motor during the feed mode if the setting of the potentiometers 82 or 83 should be such as command a constant expansion rate which is too fast for the existing conditions. Thus, the expansion rate may be limited to a maximum safe value determined directly by the pressure exerted by the tool 15 on the wall of the bore 11.

The operation of the new and improved stonewear compensator 50 of the present invention now will be explained in a general sense. The general explanation then will be followed by a more specific description.

For purposes of the general explanation, let it first be assumed that the stones 16 of the tool 15 are new and that the tool is in a collapsed position in a bore 11 of known diameter with the outer surfaces of the stones spaced inwardly a known distance from the wall of the bore. Let it further be assumed that the machine operator knows that the tool should be expanded in the rapid traverse mode through a distance corresponding to 300 counts to bring the stones closely adjacent the wall of the bore. Finally, let it be assumed that the operator knows that the tool should be expanded in the coarse feed mode through a distance corresponding to 200 counts and then should be expanded in the fine feed mode through a distance corresponding to 100 counts to hone the bore exactly to the desired final diameter. Under these circumstances, the cone mechanism 30 should advance through a total distance corresponding to 300 total counts when the expansion is converted from the rapid traverse mode to the coarse feed mode, should advance through a total distance corresponding to 500 total counts when the expansion is converted from the coarse feed mode to the fine feed mode and should advance through a total distance corresponding to 600 total counts when the fine feed mode is terminated as a result of the bore being at the proper diameter.

Based on the foregoing premises, the machine operator dials in the number 300 on the switch bank 71, dials in the number 500 on the switch bank 72 and dials in the number 600 on the switch bank 73. With the counter 51 initially holding a count of zero, a cycle then is started by initiating expansion of the tool 15.

At first, the motor 36 is energized to expand the tool 15 at the rapid traverse rate, pulses representing the change in position of the tool being fed to the count-up terminal CU of the counter from the output terminal E of the pulse generator 52 and causing the count held by the counter to increase in a positive sense from zero. When the count reaches 300 and agrees with the number dialed in on the switch bank 71, the comparator 61 produces a momentary output signal which causes the speed of the motor to be reduced and to cause the motor to expand the tool at the coarse feed rate.

Expansion of the tool 15 at the coarse feed rate continues until the pulses routed to the count-up terminal CU of the counter 51 from the output terminal E of the pulse generator 52 cause the count held by the counter to reach 500 and to agree with the number dialed in on the switch bank 72. At this time, the comparator 62 produces a momentary output signal which causes the speed of the motor 36 to reduce still further so that the motor begins expanding the tool at the slower fine feed rate. During such expansion, pulses are fed from the output terminal E of the pulse generator 52 to the count-up terminal CU of the counter 51 so as to increase the count held by the counter.

When the count reaches 600 and corresponds with the number dialed in on the switch bank 73, the comparator 63 produces a momentary output signal and, based on the premise set forth above, the bore 11 simultaneously reaches its final diameter. Accordingly, at the same time that the comparator 63 produces its output signal, the gage plug 40 enters the bore 11 to cause the flange 41 to contact the plate 42 and produce the "at-size" signal.

The "at-size" signal is routed to the reset terminal RST of the counter 51 in a manner to be explained subsequently. When the "at-size" signal is applied to the reset terminal, the counter is reset so that the count held thereby is zero. In addition, the "at-size" signal causes the motor 36 to reverse directions and to begin collapsing the tool 15.

As the tool 15 collapses, pulses are routed to the count-down terminal CD of the counter 51 from the output terminal C of the pulse generator 52. Accordingly, the count held by the counter increases in a negative sense from zero as the tool collapses. Although the count passes through minus 300 and minus 500, the comparators 61 and 62 do not produce any output signals since those comparators respond only to counts on the positive side of zero. When the count reaches minus 600, however, the comparator 63 again produces an output signal. Such signal de-energizes the motor 36 to stop further contraction of the tool 15. The output signal produced by the comparator 63 also is applied to the reset terminal RST of the counter 51 to reset the count to zero.

Let it be assumed that the cone mechanism 30 stops exactly when the motor 36 is de-energized and exactly when the count reaches minus 600. Under these circumstances, the cone mechanism will have retracted through exactly the same distance that it advanced and will be in exactly the same position that it occupied at the start of the cycle. Let it further be assumed, however, that wear occurring on the stones 16 during the first cycle has reduced the effective diameter of the tool 15 such that the cone mechanism would need to be advanced from the starting position through a distance corresponding to 25 counts before the outer surfaces of the stones reach the same position that the outer surfaces originally occupied at the start of the first cycle.

Accordingly, it may be assumed that, at the start of the second cycle, the cone mechanism 30 occupies the same position that it occupied at the start of the first cycle but that the outer surfaces of the stones 16 are spaced further from the wall of the bore by a distance corresponding to 25 counts. When the second cycle is initiated, the tool 15 again initially expands in the rapid traverse mode until the count reaches 300, at which time the rate of expansion changes over to the coarse feed mode. At the time of changeover, the stones are close to the wall of the bore 11 but, because of the reduced diameter of the tool, the tool still could be safely traversed rapidly through an additional distance corresponding to 25 counts before being switched to the coarse feed mode to prevent the stones from impacting against the wall. Accordingly, the changeover from rapid traverse to coarse feed occurs sooner than necessary and, as a result, the cycle is slowed somewhat because the tool coarse feeds through "air" at a relatively slow rate rather than approaching as closely as practical to the wall at the rapid traverse rate.

Expansion of the tool 15 at the coarse feed rate continues until the count reaches 500. Because, however, a portion of the coarse feed mode is wasted in expanding the tool through a greater expanse of air than necessary, a lesser portion of the coarse feed mode is available to actually hone the bore than was the case during the first cycle. Accordingly, when the count reaches 500 and the expansion switches to the fine feed mode in the same manner as before, the diameter of the bore is somewhat less than when the fine feed was initiated during the first cycle. As a result, it is necessary to expand the tool through a greater distance at the fine feed rate during the second cycle before the bore reaches final diameter. This, of course, increases the overall cycle time somewhat.

As the fine feed mode proceeds, the count reaches 600 but, as discussed, the bore 11 has not then reached its final diameter because of the stonewear which occurred during the first cycle. In accordance with the present invention, fine feeding of the worn tool 15 continues after the count reaches 600 but, when the count reaches that number, the counter 51 is automatically reset to zero and further counting by the counter is inhibited as the tool expands further to bring the bore 11 to final diameter. Thus, when the count reaches 600, the comparator 63 produces an output signal to reset the counter 51 to zero the same as in the first cycle. In addition, the output signal from the comparator 63 is applied to the inhibit terminal INH of the counter to prevent the counter from counting away from zero as the fine feed mode continues.

The fine feeding mode does continue until the gaging plug 40 enters the bore 11 and produces the "at-size" signal. When the signal is produced—and based on the premises set forth above—the cone mechanism 30 has advanced through a distance corresponding to 25 counts beyond the point occupied by the cone mechanism when the count reached 600 and the counter reset to zero.

When the gaging plug 40 produces the "at-size" signal, that signal causes the motor 36 to reverse and to begin collapsing the tool 15. At the same time, the "at-size" signal re-enables the counter 51 to permit the counter to resume counting. Accordingly, as the tool collapses, pulses are applied to the count down terminal CD of the counter to cause the count to increase from zero in a negative sense. When the count reaches minus 600, the output signal of the comparator 63 resets the counter to zero and also de-energizes the motor 36 to stop further retraction of the core mechanism 30 and further collapse of the tool. It will be noted that the cone mechanism retracts through a total distance corresponding to 600 counts. Because, however, the retraction and the counting first started when the cone mechanism was positioned a distance corresponding to 25 counts beyond the point where the counting stopped during the advance of the cone mechanism, the cone mechanism does not retract to its original starting point but instead stops retracting when spaced short of the original starting point by a distance corresponding to 25 counts. Thus, the starting position of the cone mechanism 30 for the third cycle is reset to compensate for the stonewear which occurred during the first cycle. Accordingly, when the third cycle is effected, the stonewear of the first cycle has no effect whatsoever on the changeover points of the expansion modes, and only the stonewear occurring during the second cycle affects the changeover points. And, the effect of stonewear occurring during the second cycle will, of course, be eliminated when compensation takes place during the completion of the third cycle. Thus, as a result of the compensator 50, the effect of stonewear is not cumulative over successive cycles but, at most, only the stonewear of the immediately preceding cycle affects the changeover points of the expansion mode of the succeeding cycle. The stonewear occurring during a single cycle usually is so negligible that the small variations in the changeover points of the succeeding cycle have no real detrimental effect on the cycle time or on the manner in which the bore is actually honed.

To explain a further advantage of the invention, let it be assumed that the operator of the machine 10 does not know exactly how far the outer surfaces of the stones 16 are spaced from the wall of the bore 11 when new stones are first placed in the tool 15. Let it further be assumed that the operator, to be on the safe side, prudently chooses to rapidly expand the tool through only a short distance to guard against the stones engaging the wall of the bore while in the rapid traverse mode. Thus, assume that the operator dials in a relatively low number such as 250 on the switch bank 71 and dials in the numbers 450 and 550 on the switch banks 72 and 73, respectively, to again provide for 200 counts in the coarse feed mode and for 100 counts in the fine feed mode.

In the manner described previously, the tool 15 will be expanded rapidly until the count reaches 250, at which time the output signal from the comparator 61 will cause the motor 36 to switch to the coarse feed mode. At the time of changeover, the stones 16 are spaced a considerable distance from the wall of the bore 11 since the operator intentionally chose to rapidly expand through only a relatively short distance. Thus, the stones cut "air" for a considerable period of time in the coarse feed mode until the stones engage the wall of the bore.

When the count reaches 450, the output signal from the comparator 62 causes the expansion to switch from the coarse feed mode to the fine feed mode. When the count reaches 550, the output signal from the comparator 63 causes the counter 51 to re-set to zero and inhibits further counting by the counter. Fine feeding of the tool 15 continues, however, until the bore 11 is honed to the correct diameter to cause the gaging plug 40 to produce the "at-size" signal.

Let it be assumed that the cone mechanism 30 advanced through a distance corresponding to 50 counts between the time the comparator 63 reset and inhibited the counter 51 and the time the gaging plug 40 produced the "at-size" signal. When the latter signal is produced, the motor 36 begins to collapse the tool 15. Such collapse continues through a distance corresponding to 550 counts and, when the count reaches minus 550, the output signal from the comparator 63 de-energizes the motor 36 to stop further collapse of the tool. Such stopping occurs with the cone mechanism 30 spaced downwardly through a distance corresponding to 50 counts from the position which the cone mechanism occupied at the start of the cycle. Accordingly, the stones 16 are withdrawn to a less collapsed position so that, during the next cycle, the stones will move closer to the wall of the bore 11 before the expansion switches from the rapid traverse mode to the coarse feed mode. Thus, the compensator 50 corrects for the machine operator's lack of precise knowledge as to the original starting position of the stones during the first cycle and, as a result, re-establishes the starting position for succeeding cycles so as to cause the stones to expand in the rapid traverse mode until the stones are close to the wall of the bore 11. The overall cycle time thus is reduced since the stones spend less time cutting "air" while in the coarse feed mode.

The compensator 51 also performs a correcting function if the machine operator should happen to select ranges of coarse and fine feeds such that the bore 11 reaches size before being honed sufficiently long in the fine feed mode. Assume, for example, that the operator again dials in the numbers 300, 500 and 600 on the switch banks 71, 72 and 73, respectively, for a total count of 600 but further assume that the bore actually reaches size when the cone mechanism 30 has advanced through a total distance corresponding only to 580 counts so that the fine feed mode occurred only through a distance corresponding to 80 counts. Under these circumstances, creation of the "at-size" signal by the gaging plug 40 resets the counter 51 to zero even though the total selected count of 600 has not been reached. When the "at-size" signal is produced, the tool 15 starts collapsing and continues to collapse until the count reaches minus 600 and the comparator 63 produces its output signal. When the tool stops, the cone mechanism 30 will have retracted through a distance corresponding to 600 counts and will have retracted upwardly a distance corresponding to 20 counts beyond the position it originally occupied at the start of the cycle. Accordingly, during the next cycle, the bore 11 will be honed while the tool 15 is being expanded in the fine feed mode through a distance corresponding to at least 100 counts so as to impart the desired fine finish to the wall of the bore. The overall cycle time will be increased somewhat because a higher percentage of the coarse feed mode will be used in the cutting of "air" due to the stones starting their expansion from a more collapsed position.

When the cone mechanism 30 is being retracted at a rapid rate, the cone mechanism may not stop exactly at the instant the motor 36 is de-energized but may instead coast under its own momentum to a slightly more retracted position. Due to the compensator 50, however, such coasting is of little significance because, at the start of the next cycle, the compensator causes the cone mechanism to advance rapidly through any "coast" distance as well as through the distance programmed into the switch bank 71. Assume, for example, that the cone mechanism 30 continues to retract through a distance corresponding to 10 counts at the time the motor 36 is de-energized and the counter 51 is reset to zero. During such coasting, the counter simply recounts to minus 10 and holds that count until the next cycle is started. At the start of such cycle, the cone mechanism 30 advances rapidly as the counter counts from minus 10 to zero and then continues to advance rapidly as the count progresses upwardly to 300 (or to any other number dialed in on the switch bank 71). Thus, any "coasting" which occurs during the collapse mode is dealt with by rapidly expanding the tool through an additional corresponding distance during the next cycle so that the effect of the coasting on the overall cycle time is minimized.

Thus, the present invention brings to the art a new and improved stonewear compensator 50 which is self-correcting. The compensator is very precise in operation and includes no complex structure to encumber the head 19 of the machine 10. The operator of the machine is not required to adjust mechanical stops when the stones 16 are replaced but instead may reset the compensator simply by changing the position of the switches 75.

A detailed description of an operating cycle now will be given. Let it be assumed that initially the head 19 is in its uppermost retracted position with the gaging plug 40 retracted from the bore 11 so that the flange 41 is out of contact with the plate 42. Thus, a size switch SS-1 is open, the switch SS-1 being shown in FIG. 3 and schematically representing the switch formed by the flange and the plate. Also, limit switches LS-1 and LS-2 associated with the head 19 are both open when the head is in its fully retracted position.

Let it further be assumed that the tool 15 initially is in its fully collapsed position so that a limit switch LS-3 associated with the tool is open. Finally, let it be assumed that the count held by the counter 51 is zero and that the machine operator has dialed in the numbers 300, 500 and 600 on the switch banks 71, 72 and 73, respectively.

Figure 3:
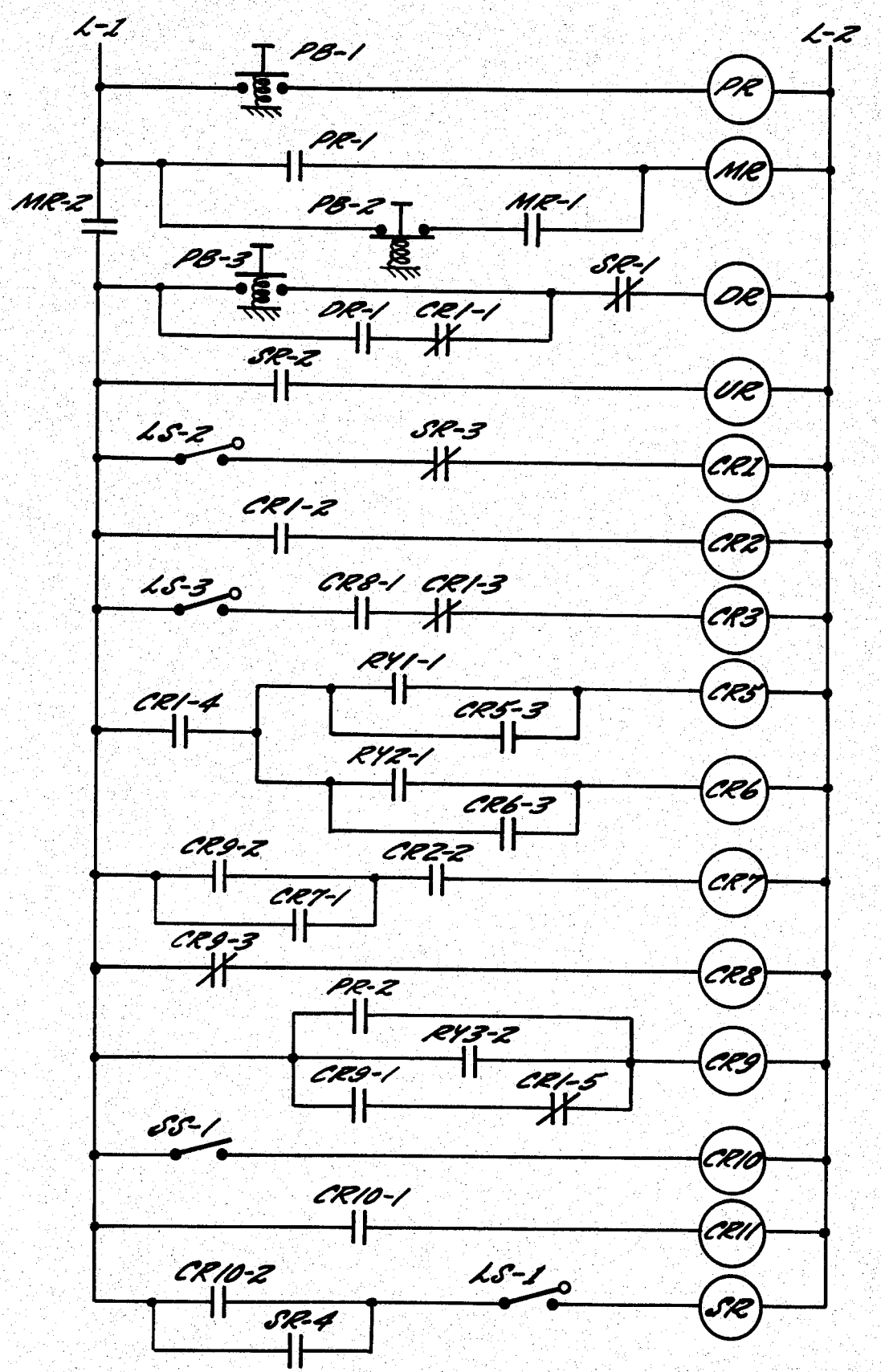
FIG. 3 is a schematic view of a circuit for controlling cycling of the machine.

The machine operator initially brings power to the circuit shown in FIG. 3 by momentarily closing push button switch PB-1 to momentarily energize a relay PR across lines L-1 and L-2. When energized, relay PR closes its contacts PR-1 to energize a relay MR which closes its contacts MR-1 to seal itself in via those contacts and normally closed push button switch PB-2. The latter switch may be manually opened by the machine operator to terminate power to the circuit.

When relay MR is energized, it closes its contacts MR-2 to bring power to the remaining portion of the circuit shown in FIG. 3. Relay contacts PR-2 close momentarily upon momentary energization of relay PR and act to energize relay CR9. Contacts CR9-1 close to seal in relay CR9 via closed contacts CR1-5. Contacts CR9-2 close idly while contacts CR9-3 open to hold out relay CR8. Accordingly, relay contacts CR8-1 remain open to hold out relay CR3.

To initiate a honing cycle, the operator momentarily closes push button switch PB-3 to energize relay DR via closed relay contacts SR-1. When energized, relay DR closes its contacts DR-1 to seal itself in via contacts CR1-1. Energization of relay DR also initiates downward movement of the head 19 through a conventional control circuit (not shown). As the head starts downwardly, limit switch LS-1 closes to prepare a circuit for relay SR.

When the head 19 reaches its working position, limit switch LS-2 closes to energize relay CR1 through closed relay contacts SR-3. Relay contacts CR1-1 open and de-energize relay DR to stop further downward movement of the head, at which time control of the head is turned over to a controller (not shown) for causing the head to reciprocate upwardly and downwardly through a short stroke during the honing operation. Energization of relay CR1 also closes contacts CR1-2 to energize relay CR2. Relay contacts CR1-3 open to hold out relay CR3 while relay contacts CR1-4 close to prepare a circuit for relays CR5 and CR6. Relay contacts CR1-5 open to de-energize relay CR9 and effect opening of relay contacts CR9-2 and closing of relay contacts CR9-3. When the latter contacts close, relay CR8 is energized to close contacts CR8-1 and prepare a circuit for relay CR3.

When relay CR2 is energized, it closes its contacts CR2-1 (FIG. 2) to prepare a circuit for the driver-amplifier 79 to the voltage source 85 via the potentiometers 81, 82 and 83. At this time, relay contacts CR5-1 (FIG. 2) and CR6-1 are closed while relay contacts CR5-2 and CR6-2 are open. Accordingly, the driver-amplifier 79 is energized via the potentiometer 81 and causes the motor 36 to start expanding the tool 15 in the rapid traverse mode. As the tool expands from its fully collapsed position, limit switch LS-3 closes but relay CR3 is held out by open contacts CR1-3.

Figure 2:
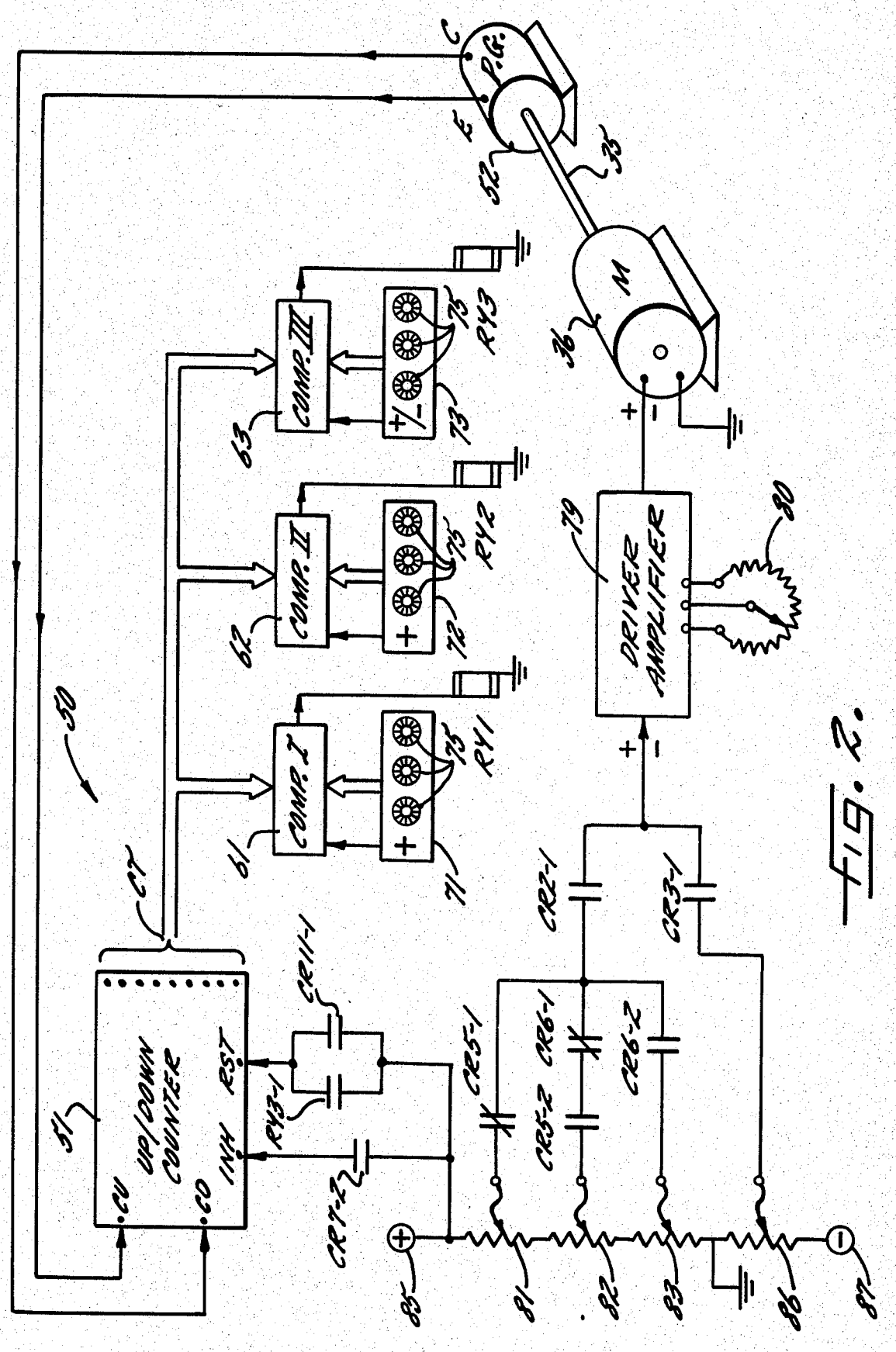
FIG. 2 is a schematic view showing the control circuits for the counter and for the drive motor.

Expansion of the tool 15 in the rapid traverse mode continues until the count held by the counter 51 reaches 300. At this time, the comparator 61 produces its output signal to momentarily energize relay RY-1 (FIG. 2). Relay contacts RY1-1 (FIG. 3) momentarily close to energize CR5 via closed relay contacts CR1-4. Upon being energized, relay CR5 closes contacts CR5-3 to seal itself in so that it will remain energized when the count exceeds 300, at which time the comparator 61 de-energizes relay RY1 to open contacts RY1-1.

When energized, relay CR5 opens its contacts CR5-1 (FIG. 2) and closes its contacts CR5-2 to switch the driver-amplifier 79 from the potentiometer 81 to the potentiometer 82 by way of closed contacts CR6-1. Accordingly, the motor 36 stops expanding the tool 15 in the rapid traverse mode and starts expanding the tool in the coarse feed mode.

Expansion of the tool 15 in the coarse feed mode continues until the count reaches 500 at which time the comparator 62 momentarily produces its output signal to energize a relay RY2 (FIG. 2) and effect closure of relay contacts RY2-1 (FIG. 3). As an incident thereto, relay CR6 is energized and closes its sealing contacts CR6-3 so that it will remain energized when the count exceeds 500 and relay RY2 is de-energized to open contacts RY2-1.

When relay CR6 is energized, it opens its contacts CR6-1 (FIG. 2) and closes its contacts CR6-2 to switch the driver-amplifier 79 from the potentiometer 82 to the potentiometer 82. Thus, the motor 36 is changed over to expand the tool 15 at the fine feed rate. Such expansion continues until the gaging plug 40 enters the bore 15 to close the switch SS-1 (FIG. 3) and produce the "at-size" signal.

Assume that the "at-size" signal is produced sometime after the count reaches 600. When the count reaches 600, the comparator 63 produces its output signal to momentarily energize a relay RY3 (FIG. 2). That relay momentarily closes its contacts RY3-1 to reset the counter 51 to zero by applying a voltage pulse to the reset terminal RST of the counter. In addition, contacts RY3-2 (FIG. 3) close to momentarily energize relay CR9 which closes its contacts CR9-2 to energize relay CR7. The latter relay closes its contacts CR7-1 to seal itself in when the count exceeds 600 and the relays RY3 and CR9 are de-energized. Relay CR7 also closes its contacts CR7-2 (FIG. 2) to apply a signal to the inhibit terminal INH of the counter 51 and to prevent further counting by the counter during continued expansion of the tool 15.

When relay CR9 is momentarily energized, relay contacts CR9-3 momentarily open and momentarily de-energize relay CR8 to momentarily open contacts CR8-1. The latter contacts re-close almost immediately, however, when relay CR8 is re-energized upon de-energization of relays RY3 and CR9.

When the bore 11 reaches diameter, the size switch SS-1 (FIG. 3) momentarily closes and momentarily energizes relay CR10 which closes its contacts CR10-1 to energize relay CR11 and idly close its contacts CR11-1 (FIG. 2). In addition, relay contacts CR10-2 (FIG. 3) close to energize relay SR via closed limit switch LS-1. Relay SR closes its sealing contacts SR-4 so as to maintain energization of the relay when size switch SS-1 opens and relay CR10 is de-energized.

When relay SR is energized, its contacts SR-1 (FIG. 3) open idly while its contacts SR-2 close to energize a relay UR and initiate upward retraction of the head 19 and also upward retraction of the gage plug 40 to open size switch SS-1. Thereupon, relays CR-10 and CR-11 are de-energized to effect opening of contacts CR11-1.

Upon energization of relay SR, contacts SR-3 (FIG. 3) open to de-energize relay CR1. Contacts CR1-1 close idly, contacts CR1-2 open to de-energize relay CR2, contacts CR1-3 close to energize relay CR3, contacts CR1-4 open to de-energize relays CR5 and CR6, and contacts CR1-5 close to prepare a circuit for relay CR9.

When relay CR1-2 is de-energized, its contacts CR2-1 (FIG. 2) open to stop further expansion of the tool 15. In addition, relay contacts CR2-2 open to de-energize relay CR7 so as to open relay contacts CR7-2 and permit the counter 51 to resume counting.

When relay CR3 is energized, it closes its contacts CR3-1 (FIG. 2) to connect the driver-amplifier 79 to the voltage source 87 via the potentiometer 86. Accordingly, the motor 36 is driven in a reverse direction to collapse the tool 15.

As the tool 15 collapses, the count held by the counter 51 increases in a negative sense from zero. Although the count passes through minus 300 and then through minus 500, the comparators 61 and 62 produce no output signals and thus the relays RY1 and RY2 remain de-energized. When the count reaches minus 600, however, the comparator 63 produces an output signal to again momentarily energize relay RY3 (FIG. 2). The contacts RY3-1 of that relay are momentarily closed to reset the counter 51 to zero. In addition, relay contacts RY3-2 (FIG. 3) close to energize relay CR9 which seals in by closing contacts CR9-1. Contacts CR9-2 close to prepare a circuit for relay CR7 while contancts CR9-3 open to de-energize relay CR8. The latter relay opens its contacts CR8-1 to de-energize relay CR3. Thus, relay contacts CR3-1 (FIG. 2) open to de-energize the motor 36 and stop further collapse of the tool 15.

When the head 19 reaches its fully retracted position, limit switch LS-1 opens and de-energizes relay SR. Accordingly, relay contacts SR-1 close to prepare a circuit for relay DR, relay contacts SR-2 open to de-energize relay UR and stop further retraction of the head 19, and relay contacts SR-3 close to prepare a circuit for relay CR1. At this point, all relays are de-energized except for relay MR and relay CR9. Another cycle may be initiated by closing push button switch PB-3.

Assume now that the "at-size" signal is produced before the count reaches 600. When the size switch SS-1 closes, relay CR10 is energized and closes its contacts CR10-1 to energize relay CR11. That relay closes its contacts CR11-1 (FIG. 2) to reset the counter 51 to zero. Relay contacts CR10-2 also close to energize the relay SR, from which point in time the cycle proceeds in the manner described above with collapse of the tool being stopped when the count reaches minus 600.

I claim:

1. A honing machine having a radially expandable and contractible tool for honing a bore to a predetermined diameter, sensing means for producing a signal when said bore reaches said diameter, a mechanism movable in one direction to expand said tool and in the opposite direction to contract said tool, reversible drive means for moving said mechanism either in the expanding direction or in the contracting direction, said drive means being responsive to said sensing means and acting to stop expansion and to initiate contraction of said tool when said signal is produced, the improvement in said machine comprising, a reversible counter having means for counting in either direction and for holding a count which may be reset to a predetermined reset value, means (a) for normally causing the count held by said counter to change in one direction as a function of the distance said mechanism moves to expand said tool, and (b) for causing the count held by said counter to change in the other direction as a function of the distance said mechanism moves to contract said tool after said signal is produced, means operable during expansion of said tool when said count changes in said one direction through a predetermined count range beginning at said reset value to inhibit said count from changing to a value other than said reset value during continued expansion of the tool, and means operable when said count changes in said other direction through the same predetermined count range during contraction of said tool to cause said drive means to stop further contraction of the tool.

2. A honing machine as defined in claim 1 further including means for resetting said count to said predetermined reset value when said count changes in said one direction through said predetermined count range or when said signal is produced, whichever occurs first.

3. A honing machine as defined in claim 2 further including means for resetting said count to said reset value when said count changes in said other direction through said predetermined count range.

4. A honing machine having a radially expandable and contractible tool for honing a bore to a predetermined diameter, sensing means for producing a signal when said bore reaches said diameter, a mechanism movable in one direction to expand said tool and in the opposite direction to contract said tool, reversible variable speed drive means (a) for moving said mechanism in the expanding direction at a rapid traverse rate, then at a slower coarse feed rate and then at a still slower fine feed rate and (b) for moving said mechanism in the contracting direction, said drive means being responsive to said sensing means and acting to stop expansion and to initiate contraction of said tool when said signal is produced, the improvement in said machine comprising, a reversible counter having means for counting in either direction and for holding a count which may be reset to a predetermined reset value, means (a) for normally causing the count held by said counter to change in one direction as a function of the distance said mechanism moves to expand said tool, and (b) for causing the count held by said counter to change in the other direction as a function of the distance said mechanism moves to contract said tool after said signal is produced, means operable when said count changes in said one direction through a first predetermined count range starting at said reset value during expansion of said tool at said rapid traverse rate to cause said drive means to effect expansion of said tool at said course feed rate, means operable when said count changes in said one direction through a second predetermined count range starting the beginning of said coarse feed rate to cause said drive means to effect expansion of said tool at said fine feed rate, means operable when said count changes in said one direction through a third predetermined count range starting at the beginning of said fine feed rate to inhibit said count from changing to a value other than said reset value during continued expansion of the tool, and means operable during contraction of the tool when said count changes in said other direction through a total count range corresponding to the sum of said first, second and third count ranges to stop further contraction of the tool.

5. A honing machine as defined in claim 4 in which said drive means comprise a d.c. torque motor, and selectively adjustable means for limiting the output torque of said motor to a predetermined value regardless of the speed of the motor.

6. A honing machine as defined in claim 4 in which said counter includes means for counting both positively and negatively from said predetermined reset value, and means for resetting said count to said predetermined reset value when said count changes either positively or negatively from said reset value through a count range equal to said total count range.

7. A honing machine as defined in claim 6 further including means for resetting said count to said predetermined reset value when said signal is produced if said signal is produced before said count changes in said one direction through said third predetermined count range.

* * * * *